United States Patent
Berstis et al.

(10) Patent No.: US 9,792,034 B2
(45) Date of Patent: *Oct. 17, 2017

(54) MULTI-SOURCE, MULTI-DESTINATION DATA TRANSFERS

(71) Applicant: International Business Machines Corporation, Armonk, NY (US)

(72) Inventors: Viktors Berstis, Austin, TX (US); Danny Yen-Fu Chen, Austin, TX (US); John W. Dunsmoir, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,199

(22) Filed: Oct. 6, 2016

(65) Prior Publication Data

US 2017/0024102 A1    Jan. 26, 2017

Related U.S. Application Data

(63) Continuation of application No. 15/004,093, filed on Jan. 22, 2016, now Pat. No. 9,495,719, which is a (Continued)

(51) Int. Cl.
*G06F 3/048* (2013.01)
*G06F 3/0486* (2013.01)
(Continued)

(52) U.S. Cl.
CPC .......... *G06F 3/0486* (2013.01); *G06F 3/0482* (2013.01); *G06F 3/04812* (2013.01);
(Continued)

(58) Field of Classification Search
CPC .... G06F 9/543; G06F 3/0486; G06F 3/04812; G06F 3/04817; G06F 3/0482
See application file for complete search history.

(56) References Cited

U.S. PATENT DOCUMENTS

| 5,608,850 A | 3/1997 | Robertson |
| 5,625,809 A | 4/1997 | Dysart et al. |

(Continued)

FOREIGN PATENT DOCUMENTS

| JP | 8077167 | 3/1996 |
| JP | 8166950 | 6/1996 |

(Continued)

OTHER PUBLICATIONS

Apperley, et al., Breaking the Copy/Paste Cycle: The Stretchable Tool, User Interface Conference, 2000, AUIC 2000, First Australasian, pp. 2-10, ISBN: 07695-0515.

(Continued)

*Primary Examiner* — Brian W Wathen
(74) *Attorney, Agent, or Firm* — Schmeiser, Olsen & Watts, LLP; Michael Petrocelli

(57) ABSTRACT

A method and system for transferring an image. Displayed are: (a) a graphic object representing a web page, (b) a first destination point within the graphic object and first text which is adjacent to the first destination point and describes the first destination point, and (c) a second, different destination point within the graphic object and second, different text which is adjacent to the second destination point and describes the second destination point. A user mouse selection of one of the destination points within the graphic object is received, and in response, a selected image is copied into the web page at the selected destination point. The first destination point, the first text, the second destination point, and the second text are stored in the transfer map. The selected image is mapped to the one of the destination points in the transfer map.

9 Claims, 5 Drawing Sheets

Related U.S. Application Data continuation of application No. 14/608,631, filed on Jan. 29, 2015, now Pat. No. 9,280,264, which is a continuation of application No. 13/901,232, filed on May 23, 2013, now Pat. No. 9,037,989, which is a continuation of application No. 10/832,036, filed on Apr. 26, 2004, now abandoned.

(51) Int. Cl.

| | | |
|---|---|---|
| *G06F 9/54* | (2006.01) | |
| *G06F 3/0481* | (2013.01) | |
| *G06F 3/0482* | (2013.01) | |
| *G06F 3/0484* | (2013.01) | |
| *G06T 1/00* | (2006.01) | |

(52) U.S. Cl.
CPC ...... *G06F 3/04817* (2013.01); *G06F 3/04842* (2013.01); *G06F 9/543* (2013.01); *G06T 1/0007* (2013.01); *G06T 2200/24* (2013.01)

(56) References Cited

U.S. PATENT DOCUMENTS

| | | | |
|---|---|---|---|
| 5,638,504 | A | 6/1997 | Scott et al. |
| 5,638,505 | A | 6/1997 | Hemenway et al. |
| 5,671,427 | A | 9/1997 | Nishimura |
| 5,734,749 | A | 3/1998 | Yamada et al. |
| 5,835,129 | A | 11/1998 | Kumar |
| 6,160,552 | A | 12/2000 | Wilsher et al. |
| 6,177,939 | B1 | 1/2001 | Blish et al. |
| 6,192,380 | B1 | 2/2001 | Light et al. |
| 6,411,311 | B1 | 6/2002 | Rich et al. |
| 6,987,512 | B2 | 1/2006 | Robertson et al. |
| 9,037,989 | B2 | 5/2015 | Berstis et al. |
| 9,280,264 | B2 | 3/2016 | Berstis et al. |
| 2003/0142134 | A1 | 7/2003 | Bates et al. |
| 2004/0100501 | A1 | 5/2004 | Dornback |
| 2004/0226012 | A1 | 11/2004 | Awada et al. |
| 2005/0102629 | A1 | 5/2005 | Chen et al. |
| 2005/0166159 | A1 | 7/2005 | Mondry et al. |
| 2005/0240866 | A1 | 10/2005 | Berstis et al. |
| 2006/0059247 | A1 | 3/2006 | Marappan et al. |
| 2013/0298048 | A1 | 11/2013 | Berstis et al. |
| 2015/0143265 | A1 | 5/2015 | Berstis et al. |
| 2016/0140682 | A1 | 5/2016 | Berstis et al. |

FOREIGN PATENT DOCUMENTS

| | | |
|---|---|---|
| KR | 20000030092 | 6/2000 |
| KR | 20030083894 | 11/2003 |
| WO | 0067123 | 11/2000 |

OTHER PUBLICATIONS

IBM Cororation, Enterprise Systems Architecture/390 Principles of Operation, Jul. 2001, 8th Edition, IBM Corporation, Poughkeepsie NY USA, 982 pages.

Ashton, D.P., Bulletin Board Buffer, Jun. 1, 1992, IBM Technical Disclosure Bulletin, vol. 35, No. 1B, pp. 287-288 [retrieved from http://ip.com/IPCOM/000108773].

Pfaffenberger, B., Websters New World Computer Dictionary, 9th Edition (2001), 4 pages.

Notice of Allowance (Mail date Jan. 13, 2015) for U.S. Appl. No. 13/901,232, filed May 23, 2013, Conf. No. 9415.

Final Amendment (Dec. 24, 2014) for U.S. Appl. No. 13/901,232, filed May 23, 2013, Conf. No. 9415.

Final Office Action (Mail date Nov. 7, 2014) for U.S. Appl. No. 13/901,232, filed May 23, 2013, Conf. No. 9415.

Amendment (Sep. 19, 2014) for U.S. Appl. No. 13/901,232, filed May 23, 2013, Conf. No. 9415.

Office Action (Mail date Jun. 20, 2014) for U.S. Appl. No. 13/901,232, filed May 23, 2013, Conf. No. 9415.

Preliminary amendment (Jul. 26, 2013) for U.S. Appl. No. 13/901,232, filed May 23, 2013, Conf. No. 9415.

Office Action (Jul. 31, 2015) for U.S. Appl. No. 14/608,631, filed Jan. 29, 2015, Conf. No. 1621.

Amendment (Oct. 30, 2015) for U.S. Appl. No. 14/608,631, filed Jan. 29, 2015, Conf. No. 1621.

Notice of Allowance (Nov. 16, 2015) for U.S. Appl. No. 14/608,631, filed Jan. 29, 2015, Conf. No. 1621.

Office Action (Mar. 24, 2016) for U.S. Appl. No. 15/004,093, filed Jan. 22, 2016.

Amendment (Jun. 22, 2016) for U.S. Appl. No. 15/004,093, filed Jan. 22, 2016.

Notice of Allowance (Jul. 20, 2016) for U.S. Appl. No. 15/004,093, filed Jan. 22, 2016.

MULTI-SOURCE, MULTI-DESTINATION DATA TRANSFERS

CROSS REFERENCE TO RELATED APPLICATION

This application is a continuation application claiming priority to Ser. No. 15/004,093, filed Jan. 22, 2016, now U.S. Pat. No. 9,495,719 issued Nov. 15, 2016, which is a continuation of Ser. No. 14/608,631, filed Jan. 29, 2015, U.S. Pat. No. 9,280,264, issued Mar. 8, 2016, which is a continuation of Ser. No. 13/901,232, filed May 23, 2013, U.S. Pat. No. 9,037,989, issued May 19, 2015, which is a continuation application of Ser. No. 10/832,036 filed Apr. 26, 2004, Abandoned.

BACKGROUND OF THE INVENTION

Field of the Invention

The field of the invention is data processing, or, more specifically, methods, systems, and products for multi-source, multi-destination data transfers.

Description of Related Art

Typical computer application software and computer operating systems provide at least some support for copies and moves of content from sources to destinations. In actual usage, however, the demand for accurate, sophisticated content transfer often outstrips available support. In effecting multiple transfers, for example, user are often required to laboriously identify or label blocks of source content or destinations for transfers, and there is little support for identifying multiple destinations for transfers. For these reasons, there is an ongoing need for improvement in the area of multi-source, multi-destination data transfers.

SUMMARY OF THE INVENTION

Methods, systems, and products are disclosed for multi-source, multi-destination data transfers that include identifying a plurality of destination points having destination contexts in one or more destination objects; selecting source content for transfer; displaying destination contexts for the destination points; and directing source content to at least one destination point in dependence upon the displayed destination contexts. In typical embodiments, identifying destination points includes recording each identified destination point and storing in association with each recorded destination point a copy of a destination context for each recorded destination point.

Typical embodiments include inserting source content at a destination point in a copy of a destination context. Typical embodiments include checking spelling of a copied destination context that includes inserted source content. Typical embodiments include checking grammar of a copied extracted destination context that includes inserted source content.

In typical embodiments, directing source content to at least one destination point in dependence upon the displayed destination contexts further comprises inserting source content at an identified destination point in a destination object. Typical embodiments include inserting source content at a selected destination point in a copied destination context and replacing the destination context in the destination object with the copied destination context including the inserted source content.

Typical embodiments include mapping a plurality of selected source content to a plurality of selected destination points. Typical embodiments include designating at least one source content for transfer, inserting the designated source content at a selected destination point in a destination object, and deleting the designated source content from a source object.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
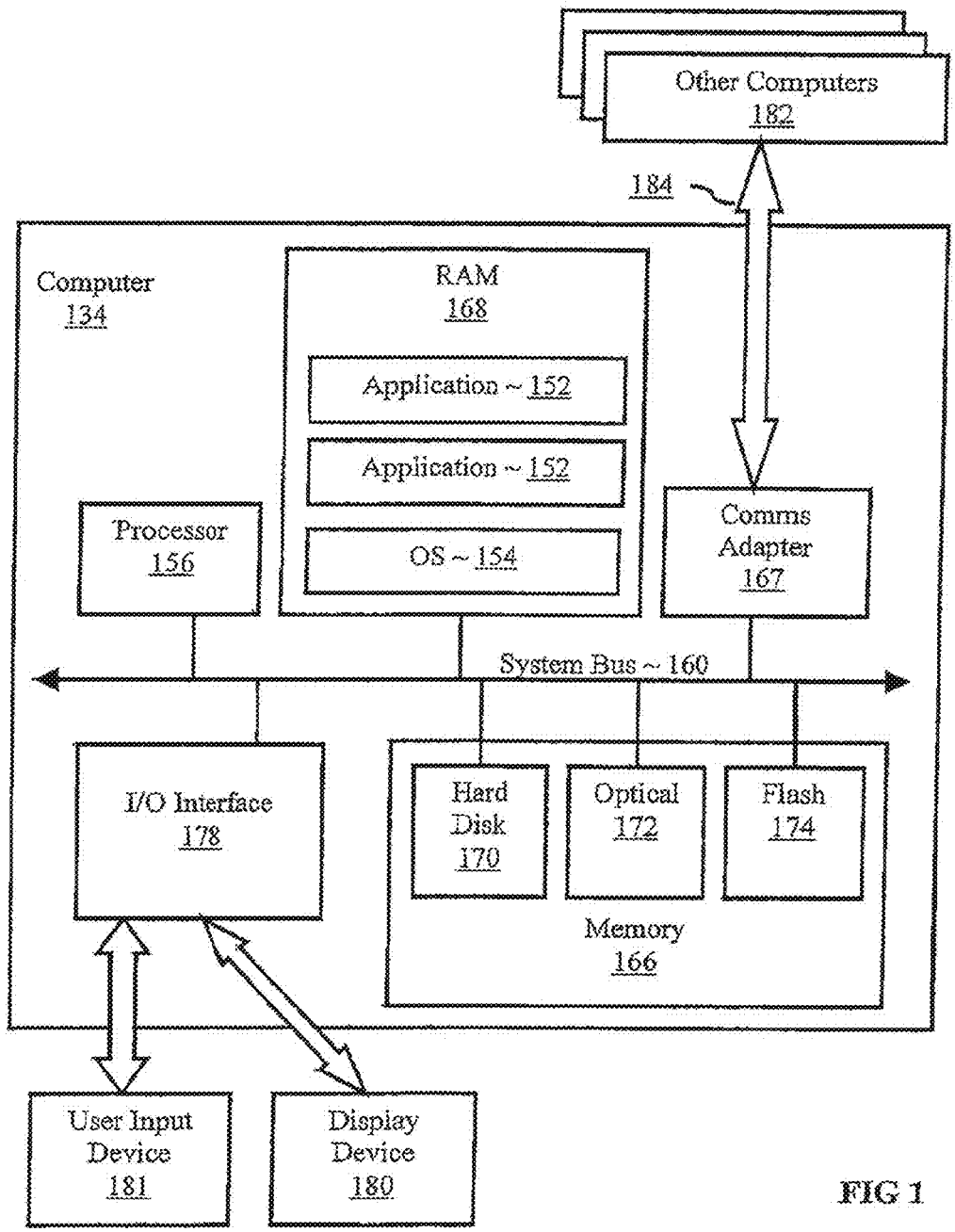
FIG. 1 sets forth a block diagram of automated computing machinery useful according to various embodiments of the present invention.

The present invention is described to a large extent in this specification in terms of methods for multi-source, multi-destination data transfers. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by a computer program stored on a computer-readable storage device such as a magnetic storage device, an optical storage device, or other storage device. The term "computer-readable storage device" does not encompass a signal propagation media such as copper cable, optical fiber or wireless transmission media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Multi-source, Multi-destination Data Transfers

Methods, systems, and products are disclosed for multi-source, multi-destination data transfers that operate generally by allowing a user to first identify multiple destination points in destination objects, then to select multiple source content, and direct the transfer of information such that some destination points may received transfers of source content and other may receive copies of source content. For example, a user may identify destination points A, B. C, and D in a destination object such as a destination word processing document and then select source content blocks X, Y, and Z in one or more source objects. The user may then direct the transfer of source content so that source content block X is copied to destination point A and to destination point B, source content block Y is transferred to destination point C, and source content block Z is transferred to destination point D.

Systems according to embodiments of the present invention typically provide for a subscreen image depicting a destination context of an identified destination point stored in memory when a destination point is identified. Thus when a paste operation is to be performed, images depicting destination contexts may be displayed to aid users in remembering or deciding which source content is to be directed to which destination. More particularly, such systems operate generally, as described in more detail below, by identifying a plurality of destination points having destination contexts in one or more destination objects, selecting source content for transfer, displaying destination contexts for the destination points, and directing source content to at least one destination point in dependence upon the displayed destination contexts.

Methods and systems according to embodiments of the present invention are implemented generally upon automated computing machinery, referred to here as "computers." For further explanation, FIG. 1 sets forth a block diagram of automated computing machinery comprising a computer (134). Computer (134) may be a personal computer, mainframe, laptop, minicomputer, personal digital assistant, wireless handheld device, a cellular telephone, or any other form of automated computing machinery useful as a system for multi-source, multi-destination data transfer according to embodiments of the present invention as will occur to those of skill in the art. The exemplary computer (134) of FIG. 1 includes at least one computer processor (156) or 'CPU' as well as random access memory (168) ("RAM"). Stored in RAM (168) are application programs (152). Application programs useful in accordance with various embodiments of the present invention include browsers, word processors, spreadsheets, database management systems, email clients, and so on, as will occur to those of skill in the art.

Also stored in RAM (168) is an operating system (154). Operating systems useful in computers according to embodiments of the present invention include Unix, Linux, Microsoft NT™, and many others as will occur to those of skill in the art. Computer program instructions for multi-source, multi-destination data transfer according to embodiments of the present invention may be implemented at least to some extent in application software (152). It is operating systems, however, that include many of the computer software instructions that support inter-application operations, and operating systems will often include many of the computer program instructions needed for multi-source, multi-destination data transfer according to embodiments of the present invention.

The computer (134) of FIG. 1 includes computer memory (166) coupled through a system bus (160) to the processor (156) and to other components of the computer. Computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer (134) of FIG. 1 includes communications adapter (167) implementing couplings for data communications (184) to other computers (182), servers or clients. Communications adapters implement the hardware level of connections for data communications through which local hosts and remote hosts or servers send data communications directly to one another and through networks. Examples of communications adapters include modems for wired dial-up connections, Ethernet (IEEE 802.3) adapters for wired LAN connections, and 802.11b adapters for wireless LAN connections.

The example computer of FIG. 1 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

Figure 2:
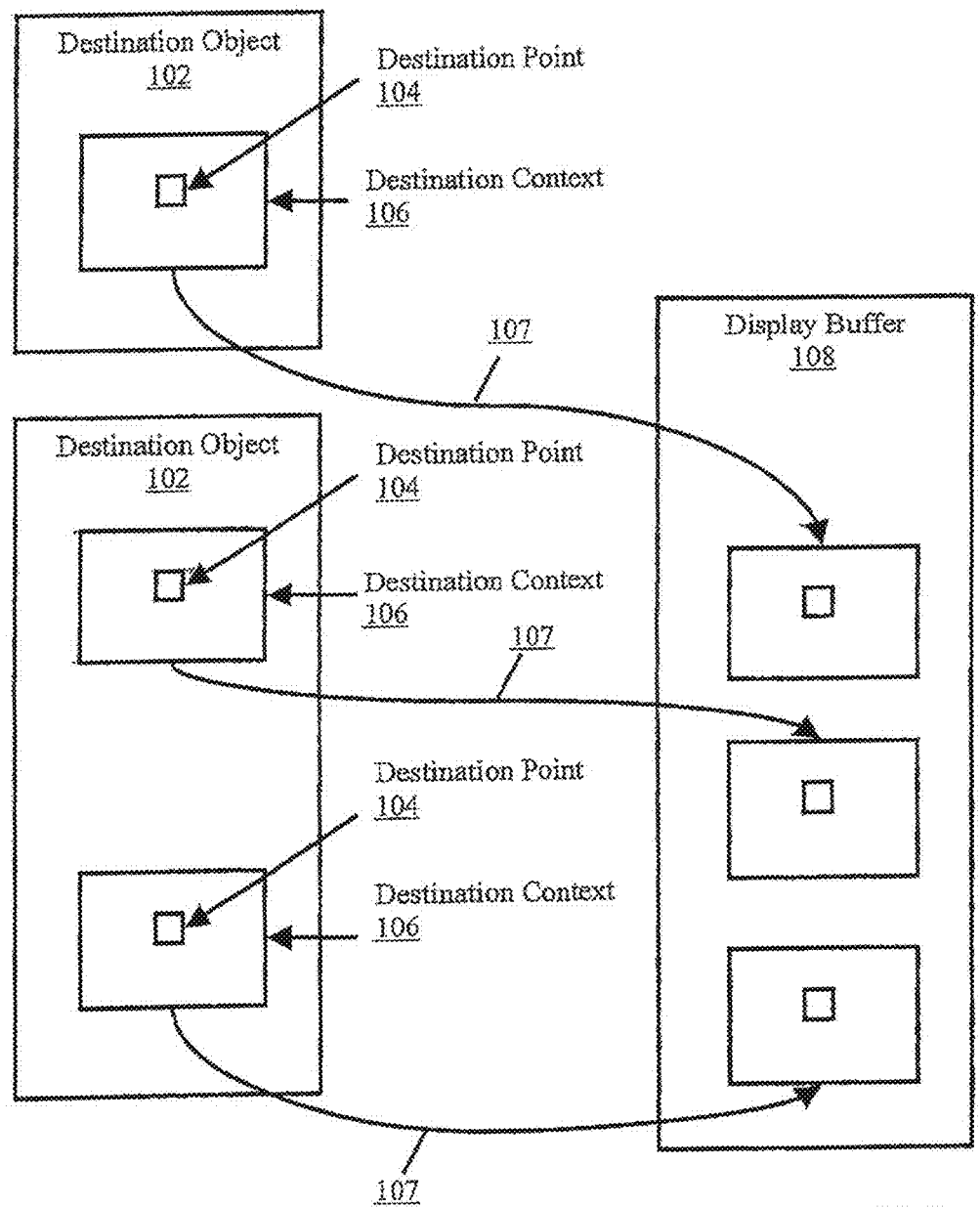
FIG. 2 sets forth a block diagram illustrating exemplary multi-source, multi-destination data transfers.

FIG. 2 sets forth a block diagram illustrating exemplary multi-source, multi-destination data transfers according to embodiments of the present invention. In the example of FIG. 2, three destination points (104) are identified in two destination objects (102). A destination object is any data structure administered by any application program or operating system component. Examples of destination objects include word processing documents, spreadsheets, database records, web pages, email documents, and so on, as will occur to those of skill in the art. A destination point (104) is a location in a destination object (102) where source content from a source object is to be inserted as a copy or a transfer.

In the example of FIG. 2, each destination point (104) in the destination object (102) has a destination context (106). A destination context (106) is a portion of a destination object that logically contains a destination point (104). If, for example, a destination object (102) includes text surrounding a destination point, a destination context may include a sentence containing the destination point, a paragraph containing the destination point, a document page containing the destination point, and so on. If the destination object (102) is a graphic object such as a JPEG file, for example, a destination context may include a two dimensional range of picture elements surrounding the destination point. Destination contexts may be displayed to advantageously provide users with a visual impression of the surroundings of a destination point thereby facilitating users' control over multi-source, multi-destination data transfers. In the example of FIG. 2, when a user identifies a destination point, the destination point and its associated destination context are copied (107) to a data structure in memory represented in FIG. 2 as a display buffer (108).

Figure 3:
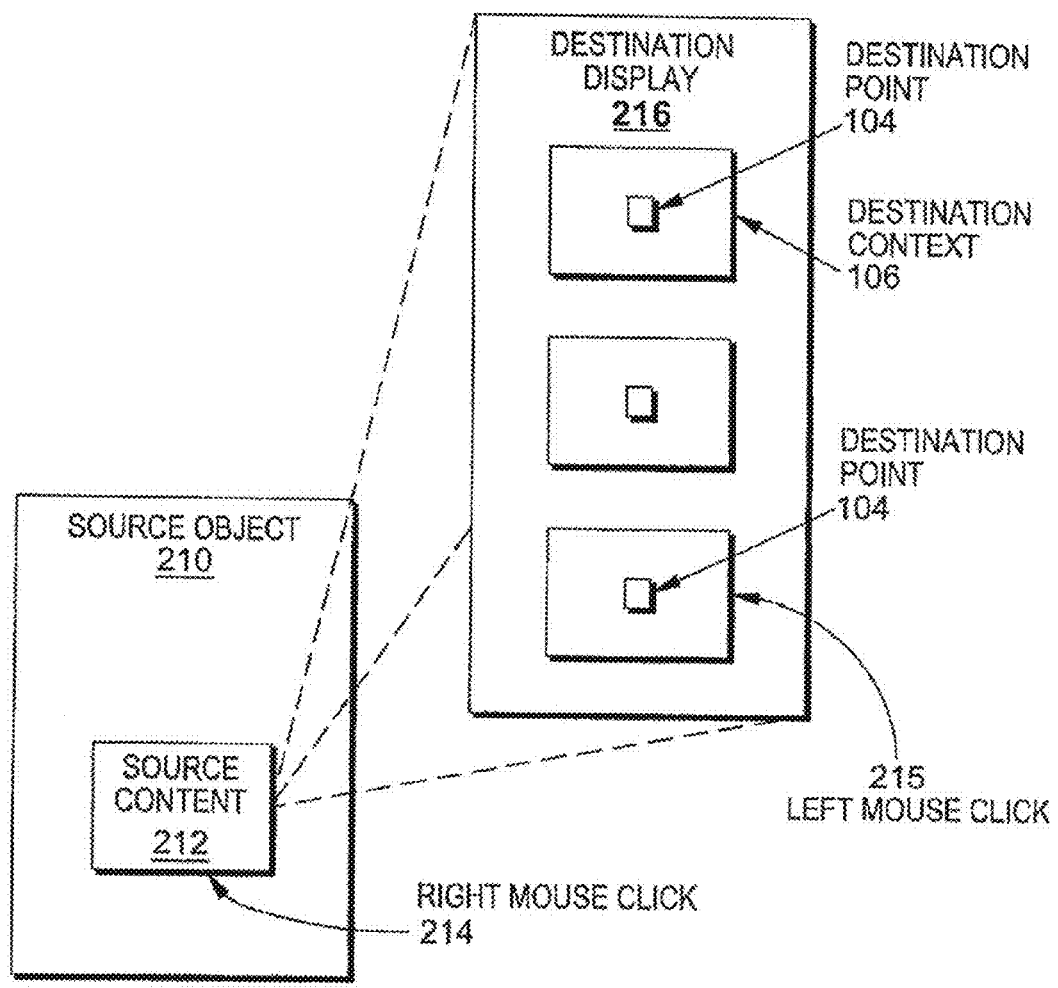
FIG. 3 sets forth a block diagram of an exemplary selection of source content in a source object.

As mentioned above, systems according to embodiments of the present invention operate generally by selecting source content for transfer to one or more identified destination points, displaying destination contexts for the destination points, and directing source content to at least one destination point in dependence upon the displayed destination contexts. FIG. 3 sets forth a block diagram of an exemplary selection of source content (212) in a source object (210). A source object (210) is any data structure administered by any application program or operating system component. Examples of source objects (210) include word processing documents, spreadsheets, database records, web pages, email documents, and so on, as will occur to those of skill in the art. Source content (212) is any portion of the source object (210) to be inserted into a destination object at a destination point. The source content is either copied or transferred into the destination object at the destination point. Source content may include selected text such as a word, sentence, or paragraph of a word processing document, a two dimensional range of picture elements from a graphic object such as JPEG file, or any other source content as will occur to those of skill in the art.

In the example of FIG. 3, a user has selected source content (212) in a source object by, for example, clicking and dragging a mouse pointer over a portion of a graphical user interface ("GUI") upon which is displayed a portion of a source object such as a word processing document. In the example of FIG. 3, a right mouse click (214) is depicted as a user's instruction to a system according to an embodiment of the present invention to direct the source content to a destination point. In response, the system has displayed a destination display (216) displaying destination contexts for previously identified destination points. In the example of FIG. 3, the user's directing selected source content (212) to a particular destination point (104) is represented by a left mouse click (215) on the displayed destination context of the destination point.

Figure 4:
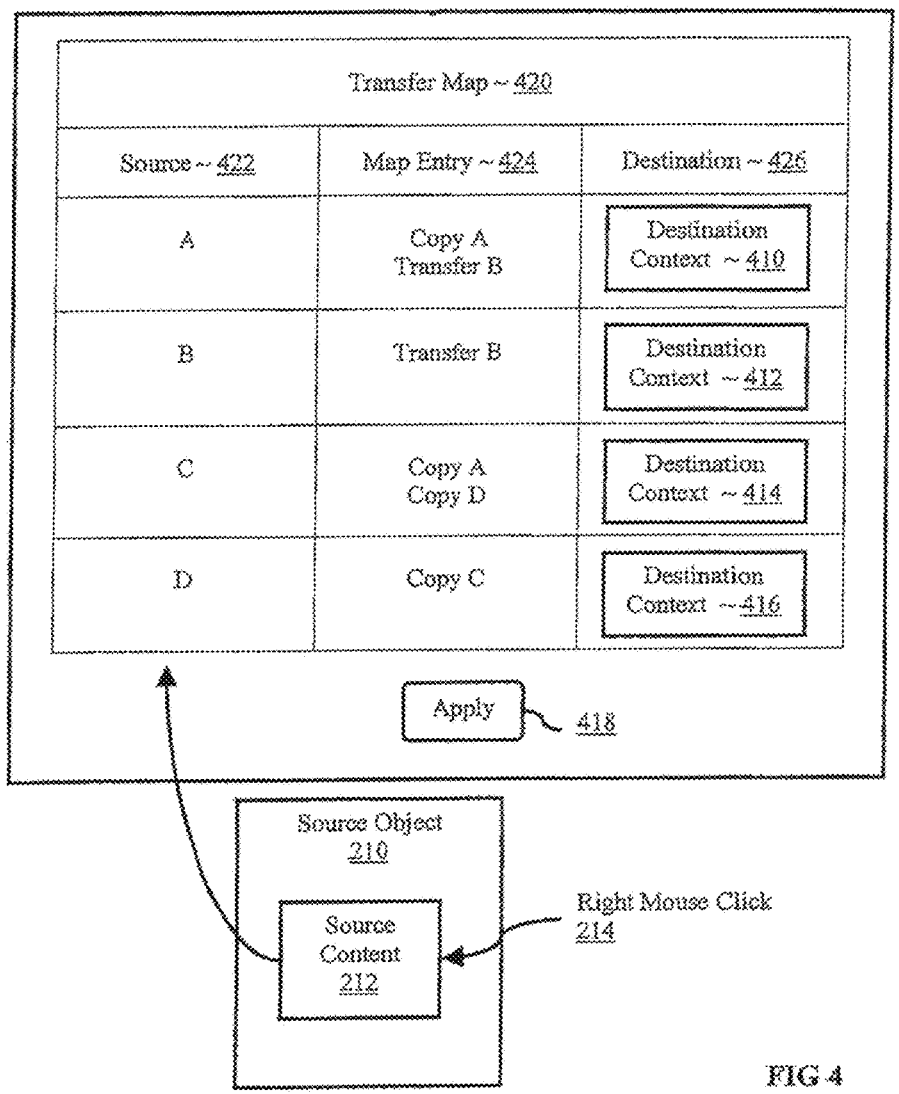
FIG. 4 sets forth a line drawing illustrating an exemplary mapping of a plurality of selected source content to a plurality of selected destination points.

FIG. 4 sets forth a line drawing illustrating an exemplary mapping, called a transfer map (420), of a plurality of selected source content to a plurality of selected destination points. Transfer map (420) is implemented as a table of three columns: a column named "Source" (422) that lists items of source content, a column named "Destination" (426) that displays images of destination contexts each of which (as explained above) includes a destination point from a destination object, and a column named "Map Entry" (424) that contains mapping entries associating source content with destination points and describes the mappings as either copies or transfers.

The selected source content in the example of FIG. 4 is represented as items A, B, C, and D. The selected source content was selected from a source object such as a word processing document or video image by highlighting the source content on a graphical user interface with a mouse-down-and-drag and the right clicking (214) the highlighted area to list the selected content in the transfer map (420). The items of source content may be implemented as blocks of text, ranges of picture elements, segments of memory, or otherwise as will occur to those of skill in the art.

In the example of FIG. 4, some source content is mapped for transfer and some for copying. Copying source content is carried out by inserting designated source content at selected destination points in one or more destination objects. Transferring source content is carried out by inserting designated source content at selected destination points in one or more destination objects and deleting the designated source content from a source object. In the example of FIG. 4, source content item A is mapped for copying to the destination point in destination context (410) and for copying to the destination point in destination context (414). Source content item B is mapped for transfer to the destination point in destination context (410) and to the destination point in destination context (412), and, because it is mapped as a transfer, source content item B is to be deleted from its source object. Source content item C is mapped for copying to the destination point in destination context (416), and source content item D is mapped for copying to the destination point in destination context (414).

Transfer map (420) may, for example, be implemented for use as a window or dialogue box in a GUI so that a user may edit the map entries (424). Such an implementation of a transfer map may support other user functions such as, for example, deleting transfer map records from the transfer map—to the extent that, for example, a user has identified a destination point whose destination context is therefore displayed in the transfer map when the user subsequently has decided not to insert any source content at that destination point. The example of FIG. 4 also provides an Apply button (418) which when invoked through a GUI operation such as a mouse click operates to carrying out all the insertions and deletions of source content described in map entries (424) in the transfer map (420).

Figure 5:
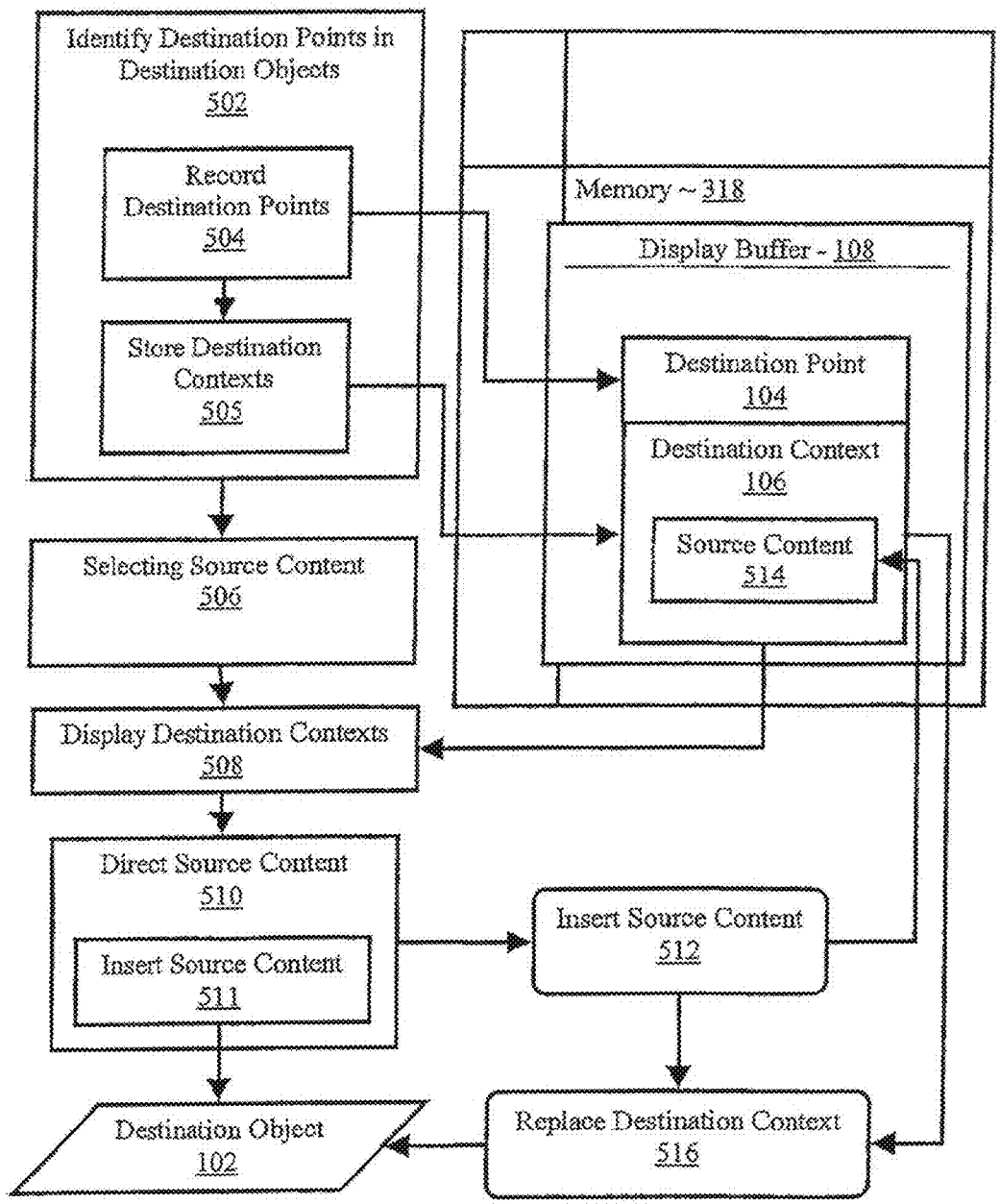
FIG. 5 sets forth a flow chart illustrating an exemplary method for multi-source, multi-destination data transfers.

Further explanation is provided with reference to FIG. 5. FIG. 5 sets forth a flow chart illustrating an exemplary method for multi-source, multi-destination data transfers that includes identifying (502) a plurality of destination points having destination contexts in one or more destination objects. A destination object is any data structure manipulated by software. Examples of destination objects include word processing documents, spreadsheets, database records, email messages, web pages, and so on, as will occur to those of skill in the art. There is no limitation in this specification regarding the number of destination points identified in a destination object. That is, methods and systems according to embodiments of the present invention support user identification of one or more destination points within any destination object.

In the method of FIG. 5, identifying (502) destination points includes recording (504) each identified destination point (104) and storing (505) in association with each recorded destination point (104) a copy of a destination context (106) for each recorded destination point (104). In the example of FIG. 5, destination points and destination contexts are stored in a buffer (108) in computer memory (318). Destination points and destination contexts may alternatively be stored in a transfer map such as the one illustrated at reference (420) on FIG. 4, and may be stored otherwise as will occur to those of skill in the art.

The method of FIG. 5 also includes selecting (506) source content for transfer, displaying (508) destination contexts for the destination points, and directing (510) source content to at least one destination point in dependence upon the displayed destination contexts. There is no limitation in this specification regarding the number of destination points in a single destination object to which a particular item of source content may be directed. That is, methods and systems according to embodiments of the present invention support directing of one item of source to content to one or more destination points in the same destination object or in more than one destination object.

In the method of FIG. 5, directing (510) source content to at least one destination point in dependence upon displayed destination contexts is carried out by inserting (511) source content at an identified destination point in a destination object (102). Directing (510) source content to at least one destination point in dependence upon displayed destination contexts may also be carried out by use of a transfer map with an Apply function as described above and in other ways as may occur to those of skill in the art.

The example of FIG. 5 includes an alternative of inserting (512) source content at a destination point (104) in a copy of a destination context (106) that may be implemented within the scope of the present invention as an alternative or in addition to inserting source content at insertion points in destination object. Inserting (512) source content at a destination point (104) in a copy of a destination context (106), for example, may advantageously support checking the spelling of a copied destination context (106) that includes inserted source content (514) and checking grammar of a copied extracted destination context (106) that includes inserted source content (514). Checking spelling and grammar of source content inserted in a destination context provides the advantage of excluding from destination objects errors originating in a source objects and also errors originating in destination contexts—so that errors originating in source object are not communicated to destinations and errors originating in destination objects are not perpetuated. Checking grammar of source content inserted in a destination context also provides the advantage of checking grammar of source content as it will lie in its new context—which may affect the correctness of the grammar because grammar that is correct in a source object may need to be altered for correct usage in its new surroundings in a destination object. The method of FIG. 5 also includes replacing (516) the destination context in the destination object (102) with the copied destination context (106) including the inserted source content (514).

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for transferring an image, said method comprising:
    displaying, by a processor of a computer system: (a) a graphic object representing a web page, (b) a first destination point within the graphic object and first text which is adjacent to the first destination point and describes the first destination point, and (c) a second, different destination point within the graphic object and second, different text which is adjacent to the second destination point and describes the second destination point;
    said processor receiving a user mouse selection of one of the destination points within the graphic object, and in response, said processor copying a selected image into the web page at the selected destination point, wherein the selected destination point is the first destination point or the second destination point;
    said processor storing the first destination point and the first text in a transfer map;
    said processor storing the second destination point and the second text in the transfer map; and
    in response to said receiving the user mouse selection of the first or second destination point within the graphic object, said processor mapping the selected image to the one of the destination points in the transfer map.

2. The method of claim 1, wherein the transfer map is a graphical user interface (GUI).

3. The method of claim 2, wherein the GUI allows a user to edit or delete the first destination point or the second destination point.

4. A computer program product comprising a computer readable hardware storage device, said storage device containing program code which, upon being executed by a processor of a computer system, implements a method for transferring an image, said method comprising:
    said processor displaying (a) a graphic object representing a web page, (b) a first destination point within the graphic object and first text which is adjacent to the first destination point and describes the first destination point, and (c) a second, different destination point within the graphic object and second, different text which is adjacent to the second destination point and describes the second destination point;
    said processor receiving a user mouse selection of one of the destination points within the graphic object, and in response, said processor copying a selected image into the web page at the selected destination point, wherein the selected destination point is the first destination point or the second destination point;
    said processor storing the first destination point and the first text in a transfer map; said processor storing the second destination point and the second text in the transfer map; and
    in response to said receiving the user mouse selection of the first or second destination point within the graphic object, said processor mapping the selected image to the selected destination point in the transfer map.

5. The computer program product of claim 4, wherein the transfer map is a graphical user interface (GUI).

6. The computer program product of claim 5, wherein the GUI allows a user to edit or delete the first destination point or the second destination point.

7. A computer system comprising a processor, a memory coupled to the processor, and a computer readable storage device coupled to the processor, said storage device containing program code which, upon being executed by the processor via the memory, implements a method for transferring an image, said method comprising:
    said processor displaying (a) a graphic object representing a web page, (b) a first destination point within the graphic object and first text which is adjacent to the first destination point and describes the first destination point, and (c) a second, different destination point within the graphic object and second, different text which is adjacent to the second destination point and describes the second destination point;
    said processor receiving a user mouse selection of one of the destination points within the graphic object, and in response, said processor copying a selected image into the web page at the selected destination point, wherein the selected destination point is the first destination point or the second destination point;
    said processor storing the first destination point and the first text in a transfer map;
    said processor storing the second destination point and the second text in the transfer map; and
    in response to said receiving the user mouse selection of the first or second destination point within the graphic object, said processor mapping the selected image to the selected destination point in the transfer map.

8. The computer system of claim 7, wherein the transfer map is a graphical user interface (GUI).

9. The computer system of claim 8, wherein the GUI allows a user to edit or delete the first destination point or the second destination point.

* * * * *